United States Patent
Ide et al.

(10) Patent No.: US 11,965,786 B2
(45) Date of Patent: Apr. 23, 2024

(54) CAPACITIVE PRESSURE SENSOR HAVING ENHANCED POSITION AND PRESSURE DETECTION ACCURACY

(71) Applicant: Futaba Corporation, Mobara (JP)

(72) Inventors: Satoshi Ide, Mobara (JP); Yuhi Taguchi, Mobara (JP)

(73) Assignee: FUTABA CORPORATION, Chiba-ken (JP)

( * ) Notice: Subject to any disclaimer, the term of this patent is extended or adjusted under 35 U.S.C. 154(b) by 32 days.

(21) Appl. No.: 17/838,599

(22) Filed: Jun. 13, 2022

(65) Prior Publication Data

US 2022/0397466 A1 Dec. 15, 2022

(30) Foreign Application Priority Data

Jun. 14, 2021 (JP) ................................. 2021-098880

(51) Int. Cl.
*G01L 1/14* (2006.01)

(52) U.S. Cl.
CPC ...................................... *G01L 1/14* (2013.01)

(58) Field of Classification Search
CPC .......... G01L 1/142; G01L 1/146; G01L 1/148
See application file for complete search history.

(56) References Cited

U.S. PATENT DOCUMENTS

| | | | | |
|---|---|---|---|---|
| 4,238,661 A * | 12/1980 | Braunlich | ................ | H01G 5/04 219/121.72 |
| 4,292,659 A * | 9/1981 | Lao | ........................ | H04R 19/04 361/283.4 |
| 9,383,282 B2 * | 7/2016 | Besling | ................ | G01L 9/0073 |
| 10,572,082 B2 * | 2/2020 | Han | ...................... | G06F 3/0447 |
| 10,866,683 B2 * | 12/2020 | Gupta | ....................... | G01L 9/12 |
| 10,928,947 B2 * | 2/2021 | Micci | .................. | G06F 3/04182 |

(Continued)

FOREIGN PATENT DOCUMENTS

EP 2154503 A2 2/2010

OTHER PUBLICATIONS

European Extended Search Report cited in corresponding European Patent Appln. No. 22 178 938.1 dated Nov. 18, 2022.

*Primary Examiner* — Tran M. Tran
(74) *Attorney, Agent, or Firm* — BACON&THOMAS,PLLC (57) ABSTRACT

There is provided a capacitive pressure sensor comprising: a dielectric layer; a first electrode disposed on a first surface of the dielectric layer and to which a pressure is applied; a second electrode disposed on a second surface of the dielectric layer opposite to the first surface and including a plurality of unit electrodes having a predetermined shape; and a measuring device configured to detect a measurement value of a capacitance of the dielectric layer for each unit electrode by causing a potential difference between the first electrode and the second electrode. An electrode area of the unit electrode is determined using an actual measurement data indicating a relationship between a change amount of the measurement value detected for each unit electrode by the measuring device when a pressure is applied to the first electrode and the electrode area of the unit electrode and using a minimum value of the change amount of the measurement value determined by conditions including the number of detection steps of a pressure detected for each unit electrode by the measuring device.

4 Claims, 8 Drawing Sheets

(56) References Cited

U.S. PATENT DOCUMENTS

| | | | |
|---|---|---|---|
| 2013/0162593 A1* | 6/2013 | Inoue | G06F 3/04166 345/174 |
| 2013/0234734 A1 | 9/2013 | Iida et al. | |
| 2019/0094087 A1* | 3/2019 | Rudy | G01L 1/146 |
| 2021/0041310 A1* | 2/2021 | Töpper | H10N 30/098 |
| 2021/0396605 A1* | 12/2021 | Vardoulis | G01L 1/148 |
| 2022/0214232 A1* | 7/2022 | Ishizaki | G01L 1/146 |
| 2022/0260434 A1* | 8/2022 | Turunen | H05K 1/095 |
| 2023/0228630 A1* | 7/2023 | Rudy | A61B 5/6807 73/763 |

* cited by examiner

| DIELECTRIC | AMOUNT OF DEFORMATION | RELATIVE PERMITTIVITY |
|---|---|---|
| AIR (AIR GAP) | ○ | △ (1.0) |
| RUBBER | △ (DEFORMATION DUE TO VOLUME MOVEMENT) | ○ (ABOUT 2.0 TO 3.5) |
| FOAM | ○ (DEFORMATION DUE TO VOLUME REDUCTION) | ○ (ABOUT 1.2 TO 2.0) |

| DIELECTRIC LAYER | RELATIVE PERMITTIVITY | 40% COMPRESSIVE LOAD [MPa] | DEFORMATION AMOUNT OF DIELECTRIC LAYER [mm] (AT 0.064 MPa) | DENSITY BEFORE APPLYING PRESSURE [kg/m³] | DENSITY AT PRESSURE OF 0.064 MPa [kg/m³] | ΔR VALUE (AT PRESSURE OF 0.064 MPa) | MINIMUM ELECTRODE AREA WHERE ΔR VALUE = 100 |
|---|---|---|---|---|---|---|---|
| SILICONE RUBBER | 3.9 | 2.419 | 0.027 | 1170 | NO CHANGE | 44 | 15.0 mm² |
| SILICONE GEL | 3.4 | 2.037 | 0.048 | 1094 | NO CHANGE | 70 | 12.0 mm² |
| SPONGE (POLYURETHANE) | 1.2 (BEFORE APPLYING PRESSURE) 1.5 (AT PRESSURE OF 0.064 MPa) | 0.115 | 0.365 | 151 | 204 | 205 | 7.9 mm² |

CAPACITIVE PRESSURE SENSOR HAVING ENHANCED POSITION AND PRESSURE DETECTION ACCURACY

TECHNICAL FIELD

The present disclosure relates to a capacitive pressure sensor having a structure in which a dielectric layer is embedded between two electrodes and configured to detect a pressure from a change in a dielectric constant of the dielectric layer deformed by a pressure applied to one of the electrodes; and, more particularly, to a capacitive pressure sensor capable of realizing high-precision detection of both a position in a plane and a pressure at the corresponding position.

BACKGROUND

Japanese Laid-open Patent Publication No. 2515-7562 discloses an invention of a capacitive sensor. The capacitive sensor of the invention includes a dielectric layer 30, a sensor unit S having a front side electrode portion 32X disposed on a front side of the dielectric layer 30 and a back side electrode portion 33Y disposed on a back side of the dielectric layer 30, and a control device 22 that is electrically connected to the sensor unit S to apply a voltage to the sensor unit S and measure the amount of electricity related to the capacitance of the sensor unit S. In accordance with the capacitive sensor 1, a foam having a semi-independent bubble structure is used for the dielectric layer 30, so that a load detection range is wide and the dielectric layer cannot be easily collapsed.

International Publication No. WO 2017/057598 discloses an invention of a capacitive sensor. The capacitive sensor of the invention includes a dielectric layer 20 made of an elastomer, and a pair of electrode units 30 and 40 having electrode layers 01X to 08X and electrode layers 01Y to 08Y, respectively, and arranged with the dielectric layer 20 interposed therebetween in a thickness direction. A pressure sensing unit D is set at a portion where the electrode layers 01X to 08X and the electrode layers 01Y to 08Y face each other via the dielectric layer 20. At a pressure range higher than MPa and lower than 0.015 MPa, the sensitivity of the capacitive sensor 1 is $7.5 \times 10^{-11}$ F/MPa or more and $7.5 \times 10^{-10}$ F/MPa or less. The pressure-strain curve thereof does not have two inflection points unlike the conventional case, and has a shape in which the strain increases monotonically over a wide pressure range. In accordance with this capacitive sensor, a load detection range is wide and, particularly, the effect of accurately detecting a small load can be obtained.

SUMMARY

A capacitive touch panel is widely used as an input/output device serving as a display device of an electronic device or the like. The capacitive touch panel has a function of outputting a position on a panel surface touched by a user as position information expressed by X and Y coordinates, but generally cannot detect a pressing force or a pressure. However, in the capacitive touch panel, further expansion of applications beyond the current state can be expected if the pressing pressure or the pressure at the position on the panel surface touched by a user can be detected together with the position information on the panel surface using the X and Y coordinate, because the corresponding pressure is the position information of the Z coordinate perpendicular to the panel surface.

For example, the X and Y coordinates can be used to detect the position on the panel surface touched by a user, and the Z coordinate can be used to detect a user's gesture when the user touches the panel surface. In other words, when a user presses a certain position on the panel surface for an intended purpose, the touch panel outputs the position information corresponding to the touched position as a signal. However, when whether or not a user's operation has occurred is checked, a pressure is detected when the user touches the panel surface, and a signal corresponding to a touched position is outputted only when the user presses the panel surface at a pressure over a specific pressure.

A capacitive pressure sensor for detecting distribution of a pressure applied to a panel surface can be considered as another application example of the capacitive touch panel. For example, in the case of providing such a capacitive pressure sensor at a holding area of a robot hand, when the robot hand holds an object, the pressure distribution in the holding area of the robot hand can be obtained. Hence, the shape of the held object can be detected to control the holding operation. Further, in the case of providing such a capacitive pressure sensor at a bed and detecting user's pressure distribution over time within a sleeping range of the bed, it is possible to measure a user' movement such as toss and turn, which is effective in nursing care and medical treatment.

As described in "Background", a general conventional capacitive sensor has a certain load detection range, but does not have a function of accurately detecting both a position and a pressure on a panel surface. Therefore, in the current state where the above-described expansion of the application fields is expected, it is expected to realize high-accuracy detection of both a position and a pressure on a panel surface in the field of the capacitive sensor.

The present disclosure has been made to solve the problems of the conventional techniques described above, and has a purpose of providing a capacitive pressure sensor capable of realizing high-precision detection of a position and a pressure on a panel surface.

A capacitive pressure sensor, according to the first aspect of the invention, comprises: a dielectric layer; a first electrode disposed on a first surface of the dielectric layer and to which a pressure is applied; a second electrode disposed on a second surface of the dielectric layer opposite to the first surface and including a plurality of unit electrodes having a predetermined shape; and a measuring device configured to detect a measurement value of a capacitance of the dielectric layer for each unit electrode by causing a potential difference between the first electrode and the second electrode; wherein an electrode area of the unit electrode is determined using an actual measurement data indicating a relationship between a change amount of the measurement value detected for each unit electrode by the measuring device when a pressure is applied to the first electrode and the electrode area of the unit electrode and using a minimum value of the change amount of the measurement value determined by conditions including the number of detection steps of a pressure detected for each unit electrode by the measuring device.

The capacitive pressure sensor, according to the second aspect of the invention, is the capacitive pressure sensor of the first aspect of the invention, wherein the dielectric layer is made of a foam that has a relative permittivity greater than a relative permittivity of air, and is easily deformed compared to rubber, and has a property that a volume decreases and a relative permittivity increases when a pressure is applied.

The capacitive pressure sensor according to the third aspect of the invention, is the capacitive pressure sensor of the first or second aspect of the invention, wherein the electrode area of the unit electrode is further reduced by increasing a deformation property and the relative permittivity of the dielectric layer, if necessary.

BRIEF DESCRIPTION OF THE DRAWINGS

The objects and features of the present disclosure will become apparent from the following description of embodiments, given in conjunction with the accompanying drawings, in which.

DETAILED DESCRIPTION

A capacitive pressure sensor 1 according to an embodiment of the present disclosure will be described with reference to FIGS. 1 to 8.

First, the principle of pressure detection using the capacitive pressure sensor 1 will be described with reference to FIGS. 1A and 1B.

Figure 1A:
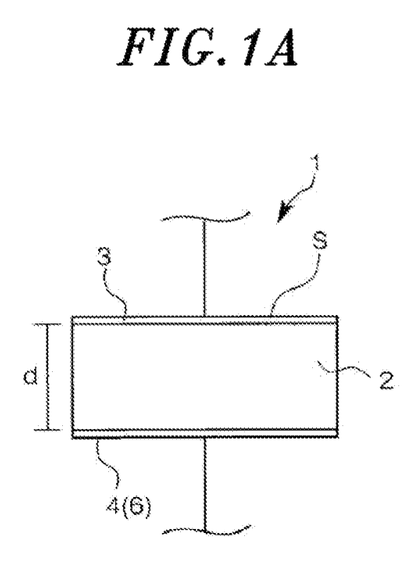
FIG. 1A shows a schematic structure of a capacitive pressure sensor.

As shown in FIG. 1A, the capacitive pressure sensor 1 includes a dielectric layer 2, a first electrode 3 disposed on an upper surface that is a first surface of the dielectric layer 2, a second electrode 4 disposed on a bottom surface that is a second surface of the dielectric layer 2, and a measuring device (not shown in FIG. 1A) for detecting a measurement value R that is in proportion to a change in a capacitance of the dielectric layer 2 by causing a potential difference between the first electrode 3 and the second electrode 4.

Figure 2:
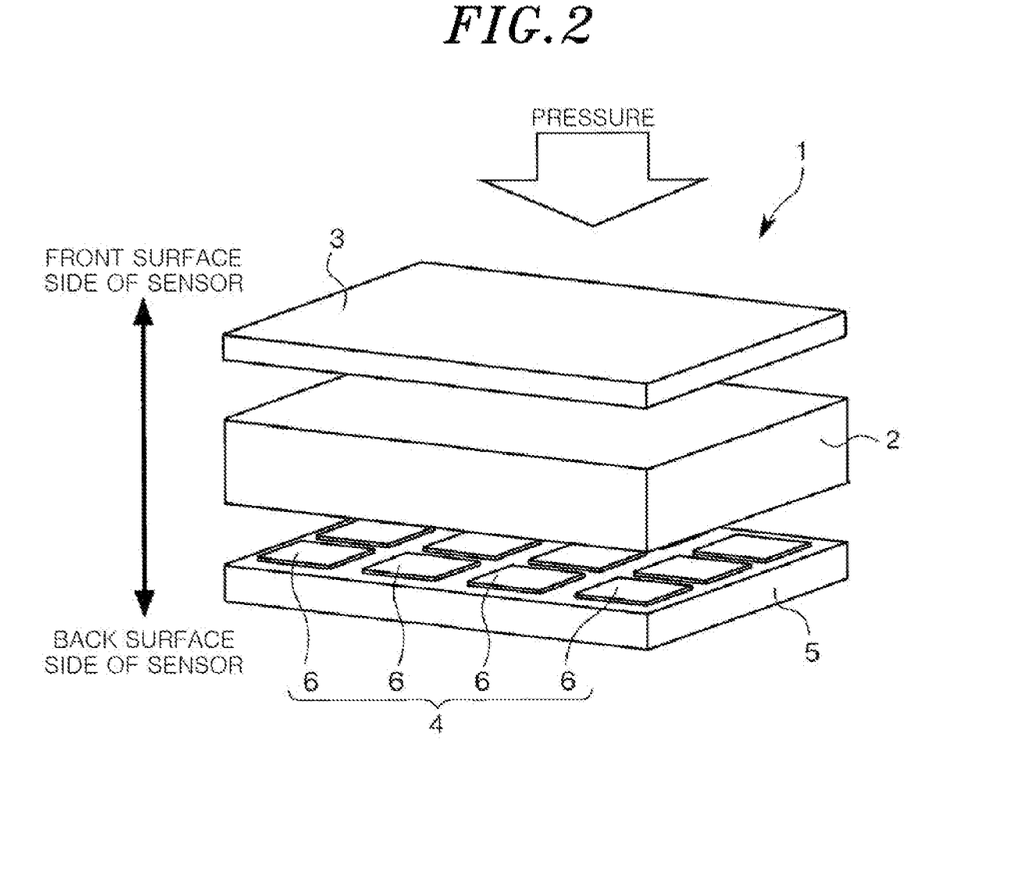
FIG. 2 is an exploded perspective view showing the structure of the capacitive pressure sensor according to an embodiment.
Figure 3:
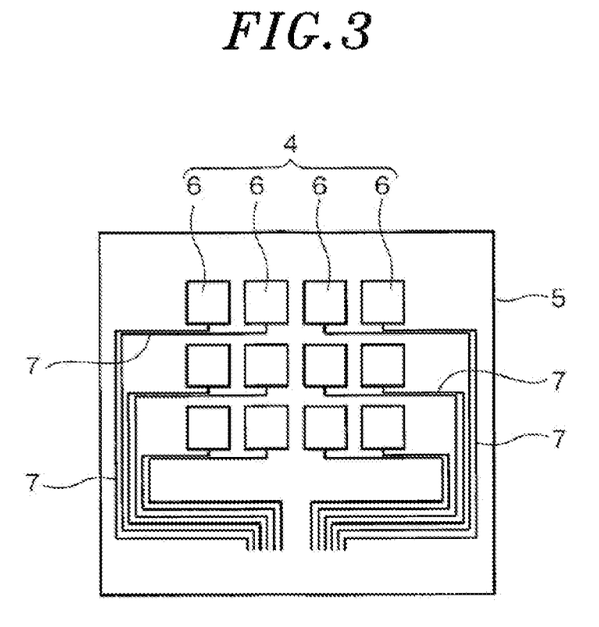
FIG. 3 is a plan view showing a wiring structure of a plurality of unit electrodes constituting a second electrode in the capacitive pressure sensor according to the embodiment.

The structure shown in FIG. 1A schematically shows a portion corresponding to one of a plurality of unit electrodes included in the capacitive pressure sensor according to the embodiment. As shown in FIGS. 2 and 3, the capacitive pressure sensor that is an actual product has a structure in which a plurality of sensors having the structure shown in FIG. 1A are arranged in parallel vertically and horizontally and connected in a self-capacitance wiring structure. The electrode structure, the wire connection structure, and the like will be described in detail later. For convenience, among the components shown in FIG. 1A, the components having the same functions as those shown in FIG. 2 are denoted by like reference numerals.

A capacitance $C_x$ of the capacitive pressure sensor 1 shown in FIG. 1A is expressed by the following Eq. (1).

$$C_x = \varepsilon_0 \varepsilon_r (S/d) = \varepsilon_0 S \times (\varepsilon_r/d) = k(\varepsilon_r/d) \qquad \text{Eq. (1)}$$

Here, $\varepsilon_0$ indicates a permittivity of vacuum; $\varepsilon_r$ indicates a relative permittivity of a dielectric forming the dielectric layer 2; S indicates areas of the first electrode 3 and the second electrode 4; d indicates distances of the first electrode 3 and the second electrode 4; and k indicates a constant.

In the capacitive pressure sensor 1 according to the embodiment, the sensor having the structure shown in FIG. 1A is connected in a self-capacitance wiring structure as described above. Therefore, an overall capacitance $C_s$ is the sum of a capacitance $C_x$ of the sensor and a capacitance (parasitic capacitance) $C_b$ of the wire or the like connected to the sensor, as shown in the following Eq. (2).

$$C_s = C_x + C_b \qquad \text{Eq. (2)}$$

Therefore, as shown in the following Eq. (3), the measuring device outputs the measurement value R that is in proportional to the capacitance $C_s$ for each sensor.

$$R = k \times C_s \qquad \text{Eq. (3)}$$

Figure 1B:
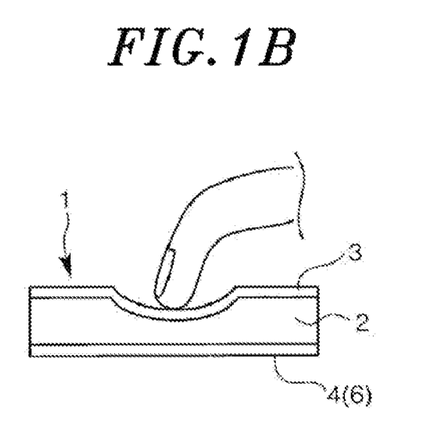
FIG. 1B schematically shows deformation of a dielectric layer in the case of pressing the capacitive pressure sensor.

As shown in FIG. 1B, when a user presses the first electrode 3 with a finger or the like, the first electrode 3 and the dielectric layer 2 are deformed so that the distance d is reduced. Accordingly, as can be seen from Eq. (1), the capacitance $C_x$ of the capacitive pressure sensor 1 increases. Hence, $C_s$ increases as can be seen from Eq. (2), and the measurement value R of the measuring device increases as can be seen from Eq. (3).

In the following description, $\Delta R$ indicates the change amount of the measurement value R. The magnitude of the pressure in the case where a user presses the first electrode 3 with a finger or a pressing device can be detected as a value obtained by subtracting the measurement value R of the capacitive pressure sensor 1 in a reference state from the current measurement value R, i.e., the change amount $\Delta R$.

Next, a specific structure of the capacitive pressure sensor 1 according to the embodiment will be described with reference to FIGS. 2 and 3.

As shown in the exploded perspective view of FIG. 2, the capacitive pressure sensor 1 includes the dielectric layer 2 that is an intermediate layer, the first electrode 3 disposed on the upper surface that is the first surface of the dielectric layer 2, and the second electrode 4 disposed on the bottom surface that is the second surface of the dielectric layer 2. The first electrode 3 may be a flexible or elastic conductive sheet-shaped member, e.g., a conductive fabric or a resin coated with PEDOT (poly(3,4-ethylenedioxythiophene)). A rigid insulating substrate 5 having substantially the same outer shape as that of the dielectric layer 2 is attached to the bottom surface of the dielectric layer 2. The second electrode 4 is disposed on the upper surface of the substrate 5, i.e., on the side facing the bottom surface of the dielectric layer 2. Therefore, in the capacitive pressure sensor 1, the first electrode 3 side serves as the front surface side (hereinafter, also referred to as "sensor surface") of the sensor to which a pressure is applied by a user's touch with a finger or the like, and the substrate 5 side or the electrode 4 side serves as the back surface side of the sensor.

As shown in the perspective view of FIG. 2 and the wiring structure diagram of FIG. 3, the second electrode 4 includes twelve square unit electrodes 6 arranged at regular intervals in the arrangement of three rows×four columns. The number of unit electrodes 6 is not limited to twelve, and may be smaller than twelve or greater than or equal to thirteen, if necessary. The unit electrodes 6 may have a shape other than a square.

As shown in FIG. 3, the twelve unit electrodes 6 arranged vertically and horizontally in three rows (arrangement of four unit electrodes 6 in the horizontal direction)×four columns (arrangement of three unit electrodes 6 in the vertical direction) are connected to a measuring device (not shown) disposed outside the substrate 5 by a wiring structure referred to as "self-capacitance wiring structure." Although not all the twelve unit electrodes 6 are marked in the drawing, dedicated wires 7 (not shown in FIG. 2) are respectively connected to the twelve unit electrodes 6. The twelve wires 7 are disposed on the substrate 5 without contact each other, and led out to the outside of the substrate 5 and connected to the measuring device (not shown) disposed outside the substrate 5. A predetermined voltage can be applied to the gap between each of the twelve unit electrodes 6 and a GND. Due to the self-capacitance wiring structure, the first electrode is grounded to the GND. As indicated by the above Eq. (2), the capacitance $C_s$ of each of the unit electrodes 6 forming the second electrode 4 is the sum of the capacitance $C_x$ of the sensor portion including the unit electrodes 6 and the capacitance (parasitic capacitance) $C_b$ of the wiring 7 or the like. The measuring device outputs the measurement value R that is in proportional to the capacitance $C_s$ as indicated by the above Eq. (3). In accordance with the self-capacitance wiring structure, the structure of the unit electrode 6 and the wiring 7 is simple, and it is easy to calculate the capacitance $C_s$ and the measurement value R in the measuring device. In other words, the measurement value R (or the change amount ΔR thereof) can be obtained for each unit electrode 6 based on the principle of the capacitive pressure sensor 1 described with reference to FIG. 1.

In the embodiment, the self-capacitance structure is used for the structure of the unit electrode 6 and the connection structure using the wiring 7. However, a mutual capacitance structure may be used for the structure of the unit electrode and the connection structure using the wiring. In other words, in the structure example shown in FIG. 3, the twelve unit electrodes 6 arranged vertically and horizontally in three rows (arrangement of four unit electrodes 6 in the horizontal direction or X direction)×four columns (arrangement of three unit electrodes 6 in the vertical direction or Y direction) include an outer rectangular frame portion and a rectangular portion disposed inside the rectangular frame portion while being insulated from the rectangular frame portion. The four rectangular frame portions are connected to the four unit electrodes 6 in the horizontal (X) direction by common wires (three in total), and three rectangular portions are connected to the three unit electrodes 6 in the vertical (Y) direction by common wires (four in total). The intersecting portions of the wires in the horizontal (X) direction and the wires in the vertical (Y) direction have an insulating structure. Then, the three wires in the horizontal (X) direction and the four wires in the vertical (Y) direction are arranged on the substrate 5 without contact with each other, and led out to the outside of the substrate 5 and connected to the measuring device (not shown) disposed outside the substrate 5. Although the first electrode 3 is connected to the GND in the self-capacitance structure, it is not necessary to connect the first electrode 3 to the GND in the mutual capacitance structure. In the mutual capacitance structure, the structure of the unit electrode and the wiring structure are complicated compared those in the self-capacitance structure, and the calculation of the capacitance $C_s$ and the measurement value R in the measuring device is also complicated. However, when there are a large number of unit electrodes, the wire arrangement or the like is limited in the self-capacitance structure adopted in the embodiment. Therefore, the mutual capacitance structure may be adopted.

Next, the material of the dielectric layer 2 in the capacitive pressure sensor 1 according to the embodiment will be described with reference to FIGS. 4 to 6.

In the capacitive pressure sensor 1 according to the embodiment, a foam (sponge) is used as a material of the dielectric layer 2, as will be described later. FIG. 4A is a comparison table showing types (three types) of materials that can be used for the dielectric layer 2 in the capacitive pressure sensor 1, the deformation amount and the relative permittivity thereof, and the symbol ○ (excellent) or Δ (good) indicating the evaluation thereof. In a general conventional capacitive pressure sensor, air (air gap) or elastically deformable rubber is often used as the dielectric layer that is an intermediate layer. However, as can be seen from this table, air has a low relative permittivity compared to a foam, and rubber is less likely to be deformed compared to a foam. Hence, both air and rubber have a low sensitivity, and thus cannot be adopted in the embodiment in which the high-accuracy pressure detection is required. In the embodiment, a foam is used as the material of the dielectric layer 2. The foam is easily deformed because bubbles (voids) in the foam are crushed and the volume of the foam (the dielectric layer 2) decreases when a pressure is applied thereto as shown in FIG. 4B, whereas and the rubber (the dielectric layer 2a) is not easily deformed because the rubber moves horizontally and the volume of the rubber does not decrease when a pressure is applied thereto as shown in FIG. 4C. In the embodiment, the dielectric layer 2 is made of a foam having bubbles, so that the relative permittivity and the deformation amount with respect to the pressure increase compared to the material of the comparative example. Accordingly, the change in the capacitance increases, which makes it possible to realize a highly sensitive capacitive pressure sensor.

Figure 5:
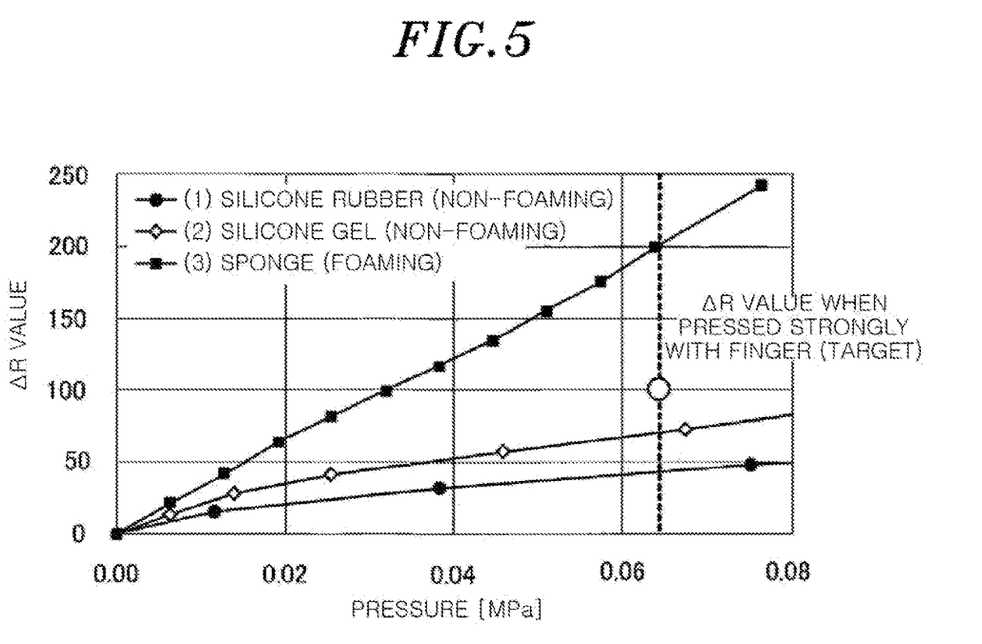
FIG. 5 is a graph showing a relationship between a pressure applied to a capacitive pressure sensor and a change amount of a measurement value in a capacitive pressure sensor according to an embodiment in which a sponge is used as a dielectric and two capacitive pressure sensors according to comparative examples in which a material other than the sponge is used as the dielectric.

FIG. 5 is a graph obtained showing, based on test results, a relationship between a pressure applied to the capacitive pressure sensor 1 according to the embodiment in which the dielectric layer 2 is made of a sponge 3 and the capacitive pressure sensor in which the dielectric layer is made of a material (silicone gel 2 and silicone rubber 1) other than the sponge and the change amount ΔR of the measurement value. The capacitive pressure sensor according to the embodiment and the capacitive pressure sensor according to the comparative example have the same material, the same structure, or the like, but they are different in the material of the dielectric layer.

According to the data of FIG. 5, in any capacitive pressure sensor, the change amount ΔR of the measurement value R increases with a substantially constant proportional constant when a pressure is applied. However, the proportional constant of the pressure and the change amount ΔR was largest in the capacitive pressure sensor 1 according the embodiment in which the dielectric layer 2 is made of a sponge. As will be described in detail later, when the change amount ΔR in which the pressure can be effectively detected in the case of pressing the capacitive pressure sensor 1 with a finger is set to 100 under certain realistic conditions, the test results show that the change amount ΔR exceeded 100 only in the capacitive pressure sensor 1 according to the embodiment, and the change amount ΔR did not exceed 100 even if the pressure was increased in two comparative examples in which the dielectric layer 2 is made of a material other than the sponge 3. This indicates that when a pressure over a pressure that is expected to be actually applied to the capacitive pressure sensor 1 is applied, high-precision pressure detection cannot be performed in the capacitive pressure sensor according to the comparative example because the change amount ΔR in which the pressure can be effectively detected is not obtained, whereas the high-precision pressure detection can be performed in the capacitive pressure sensor 1 according to the embodiment.

Figure 6:
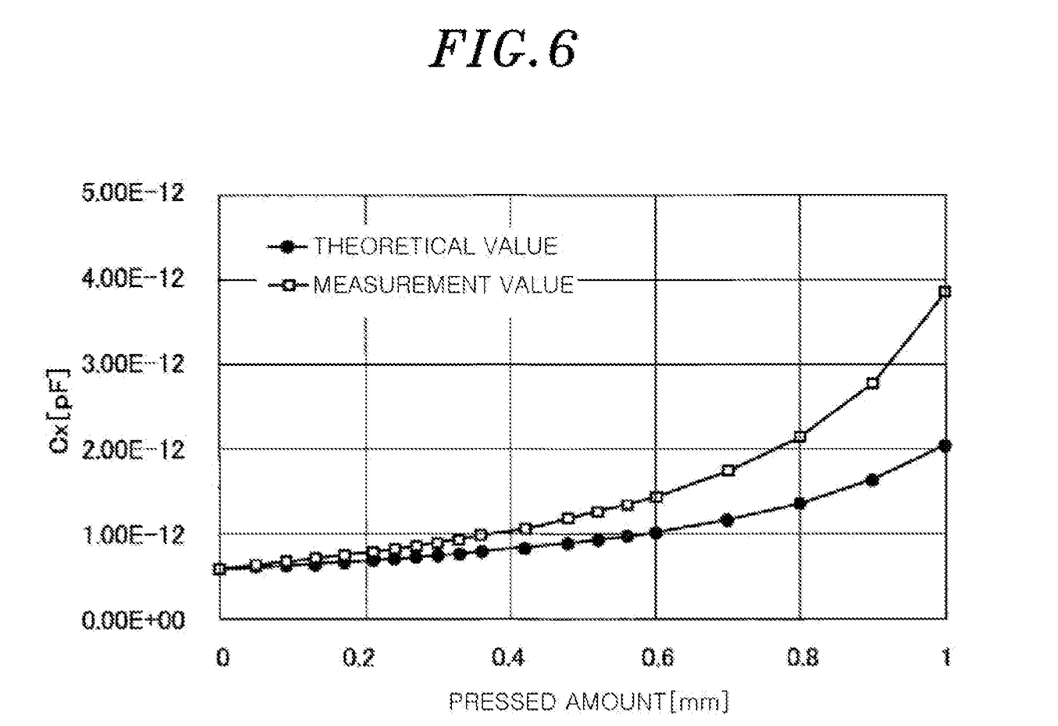
FIG. 6 is a graph showing a relationship between a pressed amount of the sponge and a relative permittivity in the capacitive pressure sensor according to the embodiment in which the sponge is used as the dielectric.

FIG. 6 shows, as theoretical values and actual measurement values, the relationship between a pressed amount (equal to the deformation amount shown in FIG. 4) of the sponge forming the dielectric layer 2 and a relative permittivity in the capacitive pressure sensor 1 according to the embodiment.

According to the data of FIG. 6, both the theoretical value and the measurement value of the capacitance increase as the pressed amount increases, i.e., as the distance d that is the thickness of the sponge decreases. The theoretical value of the relative permittivity is $2.00 \times 10^{-12}$ when the pressed amount is 1 mm, but the measurement value of the relative permittivity is $3.88 \times 10^{-12}$ when the pressed amount is 1 mm, which is a rapid increase compared to the theoretical value.

Figure 4A:
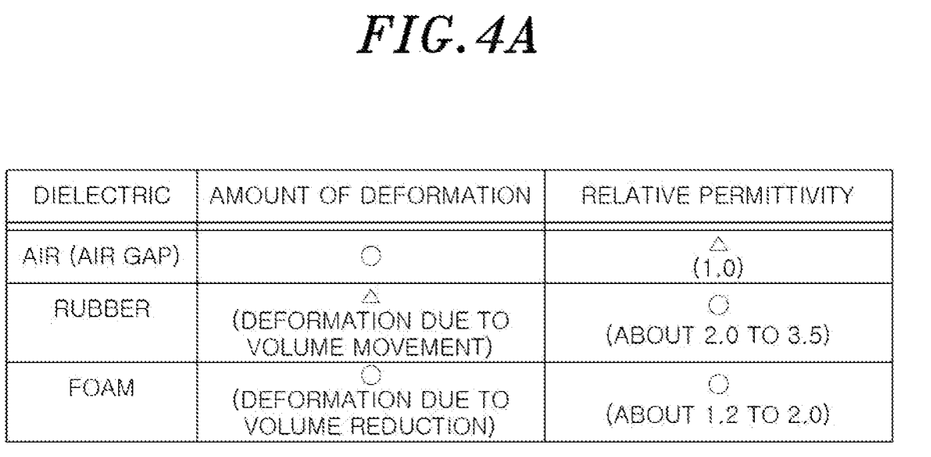
FIG. 4A is a comparison table showing types of materials that can be used for a dielectric layer and the amount of deformation and a relative permittivity thereof in capacitive pressure sensors including the capacitive pressure sensor according to the embodiment.
Figure 4B:
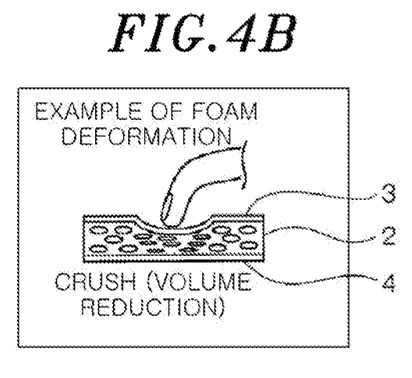
FIG. 4B shows a deformed shape of a dielectric layer made of a foam in the case of applying a pressure to the capacitive pressure sensor according to the embodiment.

As shown in FIG. 4B, when a pressure is applied to the foam, bubbles in the foam are crushed and the volume of the foam decreases. The difference between the theoretical value and the actual measurement value shown in FIG. 6 is considered to be caused by the decrease in the proportion of air due to crushed bubbles in the foam by a pressure applied thereto and the increase in the overall relative permittivity. From the above results, the foaming material that allows the distance d between the first electrode 3 and the second electrode 4 to be easily decreased due to a high forming rate and has a relative dielectric constant that easily increases due to the crushing of bubbles is suitable for the dielectric layer 2 of the capacitive pressure sensor 1 according to the embodiment.

Next, the relationship between the electrode area of the unit electrode 6 and the number of pressure detection steps in the capacitive pressure sensor 1 according to the embodiment will be described with reference to the actual measurement data shown in FIG. 7. The following description relates to a method of determining a minimum electrode area of the unit electrode 6 in order to detect a pressure with a required accuracy and detect the position information on the sensor surface with high precision when a pressure is applied to the unit electrode 6 in the capacitive pressure sensor 1 according to the embodiment.

Figure 7:
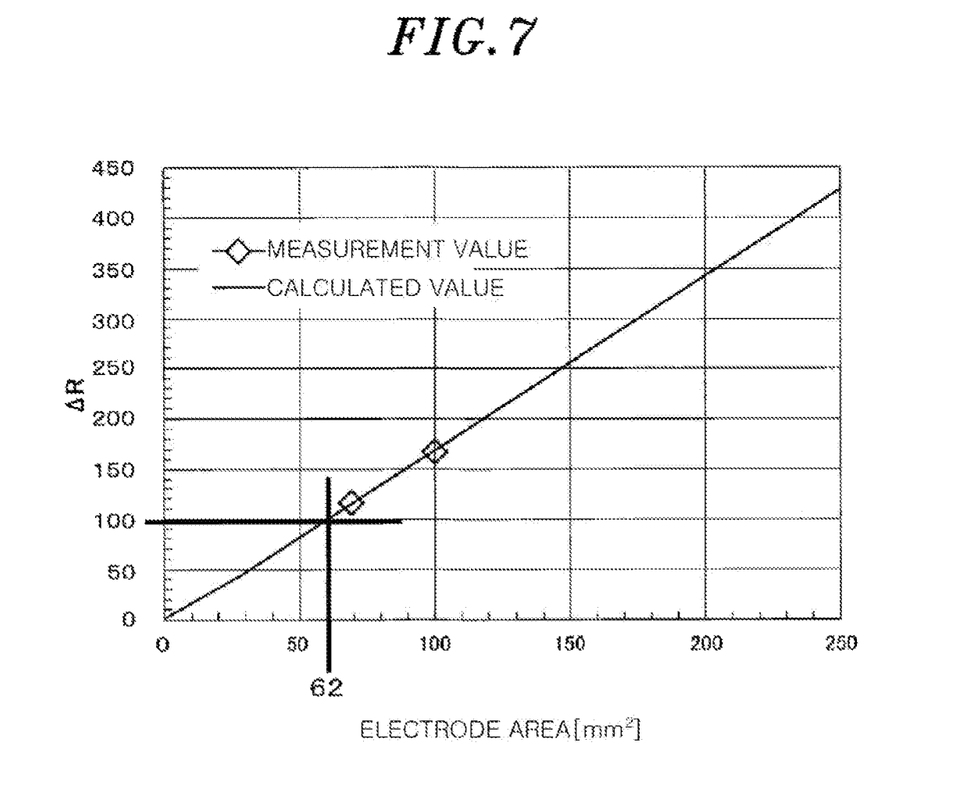
FIG. 7 is a graph obtained based on an actual measurement data showing a relationship between a change amount of a measurement value detected for each unit electrode when a predetermined pressure is applied and an electrode area of a unit electrode in the capacitive pressure sensor according to the embodiment.

A straight line rising to the right side in FIG. 7 is a graph of actual measurement data obtained from two actual measurement values (expressed by ◇) indicating the relationship between the change amount ΔR of the measurement value R detected for each unit electrode 6 when a predetermined pressure is applied and the electrode area (mm$^2$) of the unit electrode 6 in the capacitive pressure sensor 1 according to the embodiment.

Here, on the assumption that the sensor surface of the capacitive pressure sensor 1 is pressed with a finger, a minimum change amount ΔR required for pressure detection, i.e., a minimum value of the change amount ΔR of the measurement value is obtained. Then, a minimum electrode area of the unit electrode 6 where the minimum value of the change amount ΔR is obtained is determined.

First, the measurement conditions are specified. It is assumed that a load for pressing the sensor surface is 5 [N] that is a load (max) required for operating a general mechanical switch with a finger. Further, it is assumed that a diameter of a device or a user's finger that presses the sensor surface is 10 [mm]. From such assumed values, a pressure (max) at the time of pressing the sensor surface is 0.064 [MPa].

Next, five steps are assumed as the pressure detection steps. The deviation in the measurement value of the change amount ΔR due to noise during measurement was obtained, and the standard deviation σ of the change amount ΔR was set to 5 from a degree of deviation in the actual measurement value. Then, one step distinguished by pressure measurement was set to 20 from the value of ±2σ. As a result, 100 (five steps×(±2σ)=100) was the minimum value of the change amount ΔR.

Next, the capacitive pressure sensor 1 in which the second electrode 4 includes a plurality of 8.3 mm×8.3 mm (electrode area of about 68.9 mm$^2$) unit electrodes 6 and the capacitive pressure sensor 1 in which the second electrode 4 include a plurality of 10 mm×10 mm (electrode area of 100 mm$^2$) unit electrodes 6 are manufactured. Then, in each of the capacitive pressure sensors 1, a load of 5 [N] was applied with a finger having a diameter of 10 [mm] and a pressure of 0.064 [MPa] was actually applied to the unit electrodes 6. Then, the measurement result of the change amount ΔR was obtained in each measuring device of the capacitive pressure sensors 1. On the coordinate plane of FIG. 7 showing the relationship between the electrode area (horizontal axis, mm$^2$) and the change amount ΔR (vertical axis), a first point (◇ on the lower left side in FIG. 7) is plotted from the electrode area (68.9 mm$^2$) of the 8.3 mm×8.3 mm unit electrode 6 and the corresponding change amount ΔR and a second point (◇ on upper right side in FIG. 7) is plotted from the electrode area (100 mm$^2$) of the 10 mm×10 mm unit electrode 6 and the corresponding change amount ΔR are plotted and a straight line passing through these two points is drawn. The equation representing the graph of the straight line is the relational expression between the electrode area and ΔR. The two points are actual measurement data obtained by actual measurement, and the graph of the straight line obtained from the two points and the equation representing the graph are also actual measurement data.

Next, the electrode area in which the previously calculated minimum required change amount ΔR (minimum value of the change amount ΔR) becomes 100 is calculated. In the graph or the relational expression of the straight line shown in FIG. 7, the read-out or calculated electrode area at the point where the change amount ΔR becomes 100 is 62 mm². Therefore, if the unit electrode 6 having an electrode area of 62 mm² is a square, the length of one side thereof is √62 (mm²)=7.9 (mm). This corresponds to the shape and the size of a normal user's finger.

If the electrode (e.g., square having an area of 62 mm² and one side of 7.9 mm) has an electrode area determined based on the change amount ΔR of 100, the pressure applied to the sensor surface can be reliably detected with precision of five steps at the assumed specified pressure (0.064 [MPa]).

According to the relationship between the electrode area of the unit electrode 6 and the number of pressure detection steps, the unit electrode 6 has a minimum electrode area within a range in which the number of pressure detection steps, i.e., the pressure detection accuracy required by a user can be ensured. The accuracy of position detection on the sensor surface increases as the electrode area of the unit electrode 6 decreases. In other words, in accordance with the present disclosure, the position where a pressure is applied on the sensor surface of the capacitive pressure sensor 1 can be detected with high precision from the plurality of unit electrodes 6 having a minimum electrode area and, also, the pressure at the corresponding position can be detected with high precision at the number of steps required by a user.

Although the unit electrode 6 described above has a square shape, the shape thereof is not particularly limited and may be, e.g., a rhombus, a rectangle, a circle, or the like.

Figure 4C:
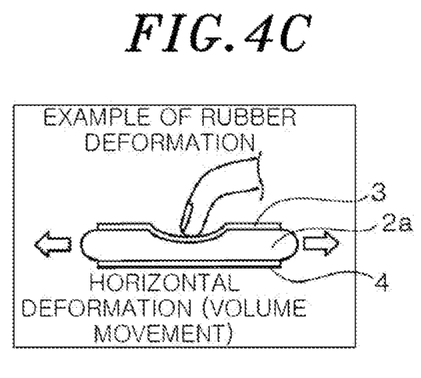
FIG. 4C shows a deformed shape of a dielectric layer made of rubber in the case of applying a pressure to a capacitive pressure sensor according to a comparative example.

Although the foam (sponge) has been described as a material forming the dielectric layer 2 that has a large deformation amount and a high relative permittivity with reference to FIGS. 4 to 5, it is necessary to select, as a material of the dielectric layer 2, a material that is deformed by a large amount when a pressure is applied and has a high relative permittivity in order to further reduce the electrode area of the unit electrode 6.

Figure 8:
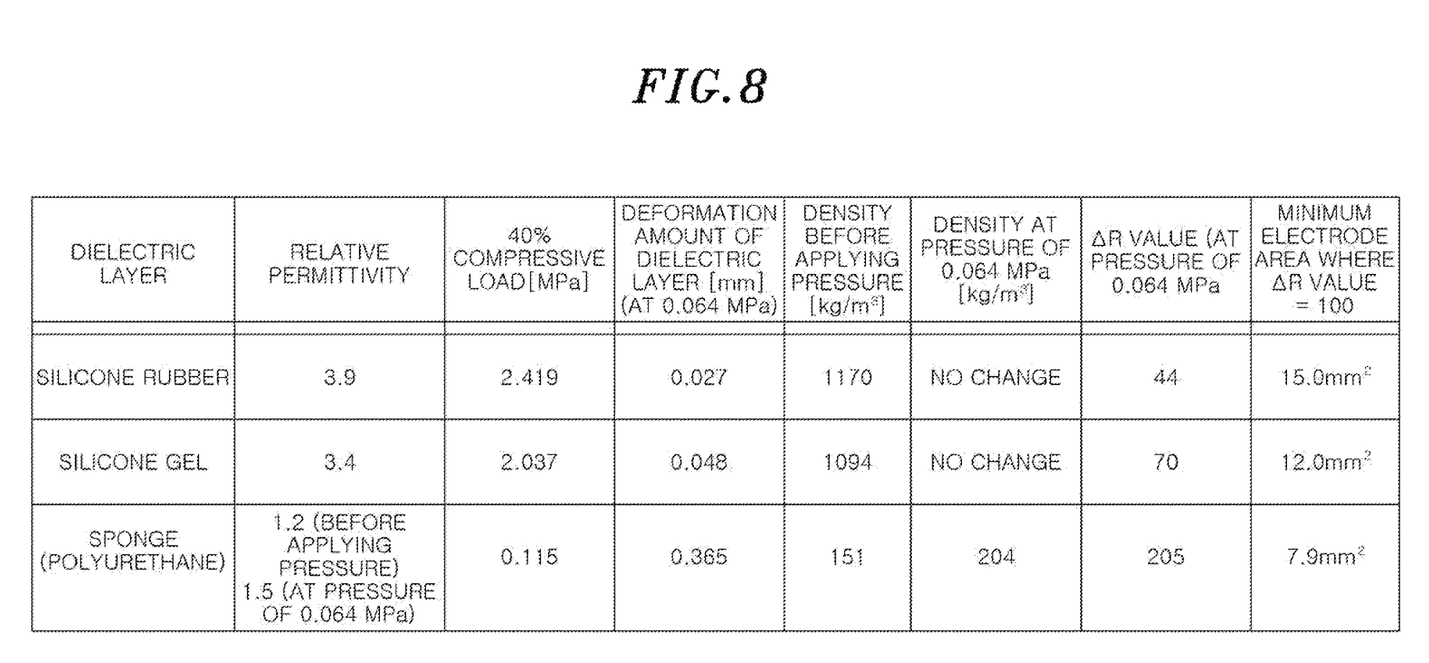
FIG. 8 is a comparison table showing a plurality of materials that can be used for a dielectric layer and physical property values thereof in capacitive pressure sensors including the capacitive pressure sensor according to the embodiment.

FIG. 8 is a comparison table comparing various physical property values including the relative permittivity and the deformation amount at a specified pressure of the sponge (polyurethane) forming the dielectric layer 2 of the capacitive pressure sensor 1 according to the embodiment, and the silicone rubber and the silicone gel in the comparative example in addition to a part of the description with reference to FIGS. 4 to 7.

The posted specific physical amounts include the relative dielectric constant, the 40% compressive load [MPa], the deformation amount [mm] at the specified pressure (0.064 [MPa]) in the case of pressing the sensor which is assumed in the description of FIG. 7, the density [kg/cm³] before pressure application, the density [kg/cm³] at the specified pressure (0.064 [MPa]), the change amount ΔR at the specified pressure (0.064 [MPa]), and the minimum electrode area of the unit electrode 6 in which the change amount ΔR becomes 100 which is described with reference to FIG. 7.

The reason that a sponge (polyurethane) is suitable for a material of the dielectric layer 2 in the capacitive pressure sensor 1 according to the embodiment will be described based on the values in the comparison table of FIG. 8. The sponge contains a large amount of bubbles, and thus has a relative permittivity smaller than those of silicone rubber and silicone gel (hereinafter, referred to as "two comparative examples"). However, the 40% compressive load [MPa] of the sponge is smaller than or equal to 1/10 of those of the two comparative examples, and the deformation amount of the sponge [mm] at the specified pressure (0.064 [MPa]) in the case of pressing the sensor is greater than those of the two comparative examples by eight times or more. Since the sponge is easily deformed, it is easy to obtain high sensitivity in the capacitive pressure sensor 1. Further, since the sponge is easily pressed and deformed, bubbles are crushed (see FIG. 4B) and the relative permittivity increases, which makes it possible to obtain high sensitivity. In addition, the density [kg/cm³] of the sponge before pressure application is smaller than those of the two comparative examples. The density [kg/cm³] at the specified pressure (0.064 [MPa]) is substantially the same in the two comparative examples, but increases by 1.35 times in the case of the sponge, which indicates that the deformation amount increases due to crushing of bubbles by compression. The value of the change amount ΔR of the sponge at the specified pressure (0.064 [MPa]) is approximately three times or more than those of the two comparative examples. The minimum electrode area of the unit electrode 6 in which the change amount ΔR (becomes 100 is smallest in the case of the sponge. When the unit electrode 6 is a square, the sponge has a side length of 7.9 mm, the silicone rubber has a side length of 15.0 mm, and the silicone gel has a side length of 12.0 mm. Therefore, the unit electrode 6 can be most compact in the case of the embodiment in which the sponge is adopted.

The invention claimed is:

1. A capacitive pressure sensor for performing position detection of a position to which a pressure is applied on a sensor surface, comprising:
   a dielectric layer;
   a first electrode disposed on a first surface of the dielectric layer and to which a pressure is applied;
   a second electrode disposed on a second surface of the dielectric layer opposite to the first surface and including a plurality of unit electrodes having a predetermined shape; and
   a measuring device configured to detect a measurement value of a capacitance of the dielectric layer for each unit electrode by causing a potential difference between the first electrode and the second electrode:
   wherein an electrode area of the unit electrode is determined using an actual measurement data indicating a relationship between a change amount of the measurement value detected for each unit electrode by the measuring device when the pressure is applied to the first electrode and the electrode area of the unit electrode and using a minimum value of the change amount of the measurement value determined by measurement conditions, and
   wherein the measurement conditions include a pressure detection accuracy of the measurement data required by a user, expressed as a predetermined number of detection steps of the pressure detected for each unit electrode by the measuring device.

2. The capacitive pressure sensor of claim 1, wherein the dielectric layer is made of a foam that has a relative permittivity greater than a relative permittivity of air, and is more deformable than rubber, and has a property that a volume decreases and a relative permittivity increases when a pressure is applied.

3. The capacitive pressure sensor of claim 1, wherein the electrode area of the unit electrode is further reduced by increasing a deformation property and a relative permittivity of the dielectric layer.

4. The capacitive pressure sensor of claim 2, wherein the electrode area of the unit electrode is further reduced by increasing a deformation property and the relative permittivity of the dielectric layer.

* * * * *